R. F. CHATILLON.
SPRING SCALE.
APPLICATION FILED DEC. 18, 1916.
1,323,831.
Patented Dec. 2, 1919.
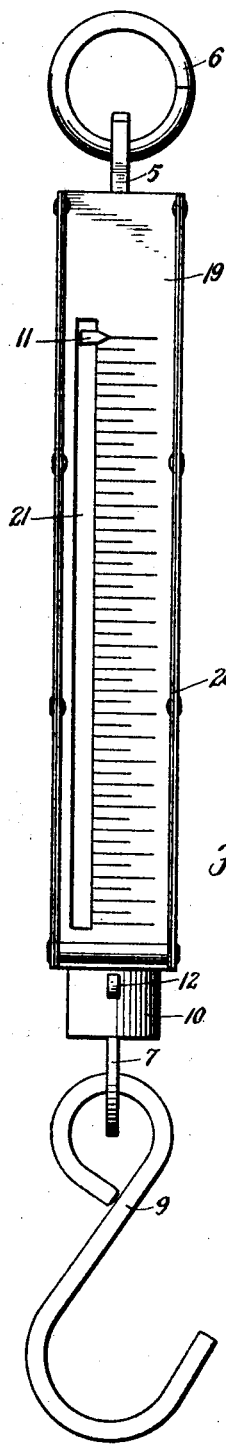
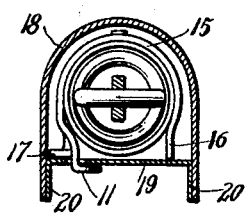
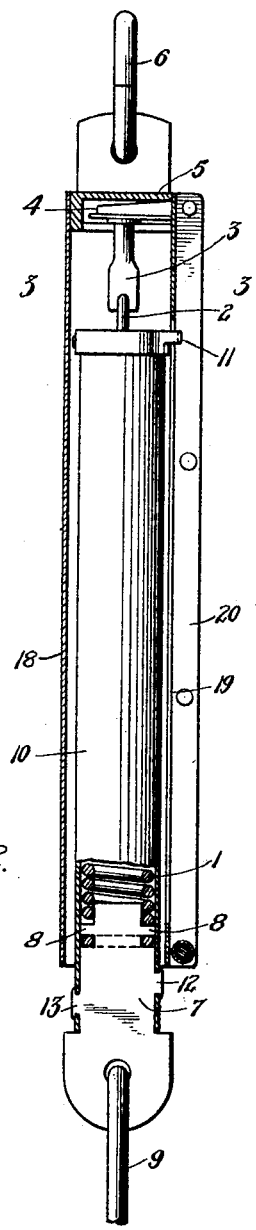
Inventor
Ralph F. Chatillon
By his Attorneys
Edwards, Sager & Wooster

UNITED STATES PATENT OFFICE.

RALPH F. CHATILLON, OF SCARSDALE, NEW YORK, ASSIGNOR TO JOHN CHATILLON & SONS, A CORPORATION OF NEW YORK.

SPRING-SCALE.

1,323,831.   Specification of Letters Patent.   Patented Dec. 2, 1919.

Application filed December 18, 1916.  Serial No. 137,561.

*To all whom it may concern:*

Be it known that I, RALPH F. CHATILLON, a citizen of the United States, residing at Scarsdale, in the county of Westchester and State of New York, have invented certain new and useful Improvements in Spring-Scales, of which the following is a full, clear, and exact specification.

This invention relates to weighing scales and particularly to those types of scales wherein the weight is determined by the measured elongation of a spring.

The object of the invention is to provide a rigid and compact structure using a minimum amount of metal for the weights to be handled. To reduce the dimensions of the scale for a given size of spring, the casing is formed to closely follow the contour of the runner within it. A cylindrical runner will have a casing substantially semi-circular in section with extended parallel sides. To give strength and stiffness of the parts the face-plate of the scale is flanged and inset between the sides of the casing and the supporting member at the lower end of the runner is so riveted in place that it will not work loose in use, but will serve to strengthen the runner.

It is a further object of the invention to position the pointer at one side of the face-plate and to provide a guiding means for the scale runner which will accurately hold it against twisting and binding. All the movable parts are thus constrained to free but accurate movements and a large area of the face-plate is left clear for the scale numbers without requiring unnecessary width.

In the accompanying drawings:

Figure 1 is a vertical face view of scales embodying my invention;

Fig. 2 is a longitudinal sectional view, and

Fig. 3 is a section on line 3—3 of Fig. 2.

In the embodiment shown, 1 is a central spring member supported at its upper end by one of its loops 2 passing through a hole in bar 3, wedged into recess 4 of the headpiece 5 suspended from loop 6. The lowermost convolution of the spring is fastened to the suspension member 7 by engagement beneath lugs 8 thereof. The upper end of member 7 is extended to fit within the spring 1 and at its lower end is provided with a hook 9.

To protect the spring and accurately guide it in its movements a cylindrical housing or runner 10 is provided fastened to the spring at its lower end to move therewith and carry the laterally offset scale pointer 11. The runner 10 is fastened to the spring 1 through suspension member 7 which has rivets 12 and 13 passing through recesses in said runner, serving to hold the parts firmly together. These rivets 12 and 13 are not arranged in the same straight line but are off set with relation to each other longitudinally of the runner as shown in Fig. 2. This arrangement of rivets serves to hold the parts permanently and rigidly fastened together, for these off-set rivets cannot serve as a pivot for relative turning movements between the suspension member 7 and the runner 10.

At the upper end of the runner is fastened a band 15 opposite ends of which 16 and 17 are extended to form guides for the runner against the rear face of the face-plate of the scales. Fastened to the head-piece 5 is the scale casing 18, substantially semi-circular in section and following closely the contour of the runner 10 and its band 15. The sides of the casing 18 are substantially parallel and are extended to receive between them face-plates 19 flanged as at 20 and inset between the extended sides of the casing. Face-plate 19 has a slot 21 through which projects the offset scale pointer 11 formed by a bent-over end of the collar 15 so as to overhang the graduations. The extended ends 16 and 17 of the collar 15 form, with the casing 18, accurate guides for the runner 10, permitting it to freely move up and down, but holding it against twisting. Any twisting movement applied to the movable parts will bring projection 16 or 17 into contact with the rear surface of face-plate 19 before the pointer can twist in either direction out of its normal path.

The pointer 11 of the scale is positioned at one side of the face-plate as shown in Fig. 1 so as to secure compactness of the scale as a whole while still leaving a large uninterrupted area for the scale numbers. This involves offsetting the pointer, and even a slight twisting of the runner would tend to either bind the pointer, or throw it rearwardly out of the slot, unless prevented by the guides 16, 17. In the old type of wide face, center pointer scale this displacement of the pointer when the runner twists is less likely to occur, but such scales, for a given capacity are about twice as wide as the scale of this invention.

The flanges 20 of face-plate 19 are rigidly riveted to the casing 18 forming a stiff compact structure in which the casing proper and the face-plate serve as guiding means for the runner. The insetting of the face-plates not only stiffens the structure but also houses and protects the scale pointer.

By making the casing 19 to follow closely the periphery of the runner 10 not only is accurate guiding means provided for the runner, but the amount of material used in the construction of the scale is greatly reduced. At the same time the extra stiffening and guiding means provided in connection with the runner hold all the movable parts in accurate alinement and retain them against twisting stresses. These advantages are attained in the present structure with an actual saving of material. All the parts are rigidly and permanently held in operative relation and the structure attains a maximum strength and durability for its size.

It is apparent that the sizes and proportions of parts may be changed to meet the varying demands of service. The invention is not confined to the specific embodiments shown and described, but is intended to include such modifications thereof as fall within the scope of the appended claims.

I claim:

1. A casing for a weighing scale comprising a semi-cylindrical plate having extended substantially parallel sides, and an outwardly flanged face-plate having a pointer slot inset between said sides from top to bottom so that the pointer will run between said flanges and be protected thereby.

2. A suspension member for a weighing scale, comprising a neck portion recessed to receive the end of the spring and having fastening lugs for a runner in different transverse planes.

3. In a weighing scale, the combination with a runner and a laterally offset overhanging pointer, of a dial having a laterally offset slot receiving said pointer, and means moving with the pointer having projecting lugs adapted to engage the inner surface of said dial on opposite sides of said slot for maintaining said pointer in said slot.

4. In a weighing scale, the combination of a tubular casing open on one side, a channeled inset face-plate having a pointer slot and graduations at one side, a spring, a runner having an offset pointer projecting through said slot and overhanging said graduations, and guiding means carried by the runner laterally on each side of the slot and coöperating with the inner surface of the face-plate at separated points to prevent twisting of the pointer out of its normal path.

In testimony whereof I affix my signature.

RALPH F. CHATILLON.